March 27, 1928.
F. K. FLYNN
1,664,203
CUTTING MECHANISM FOR CANE HARVESTERS AND THE LIKE
Filed Oct. 11, 1922  3 Sheets-Sheet 1
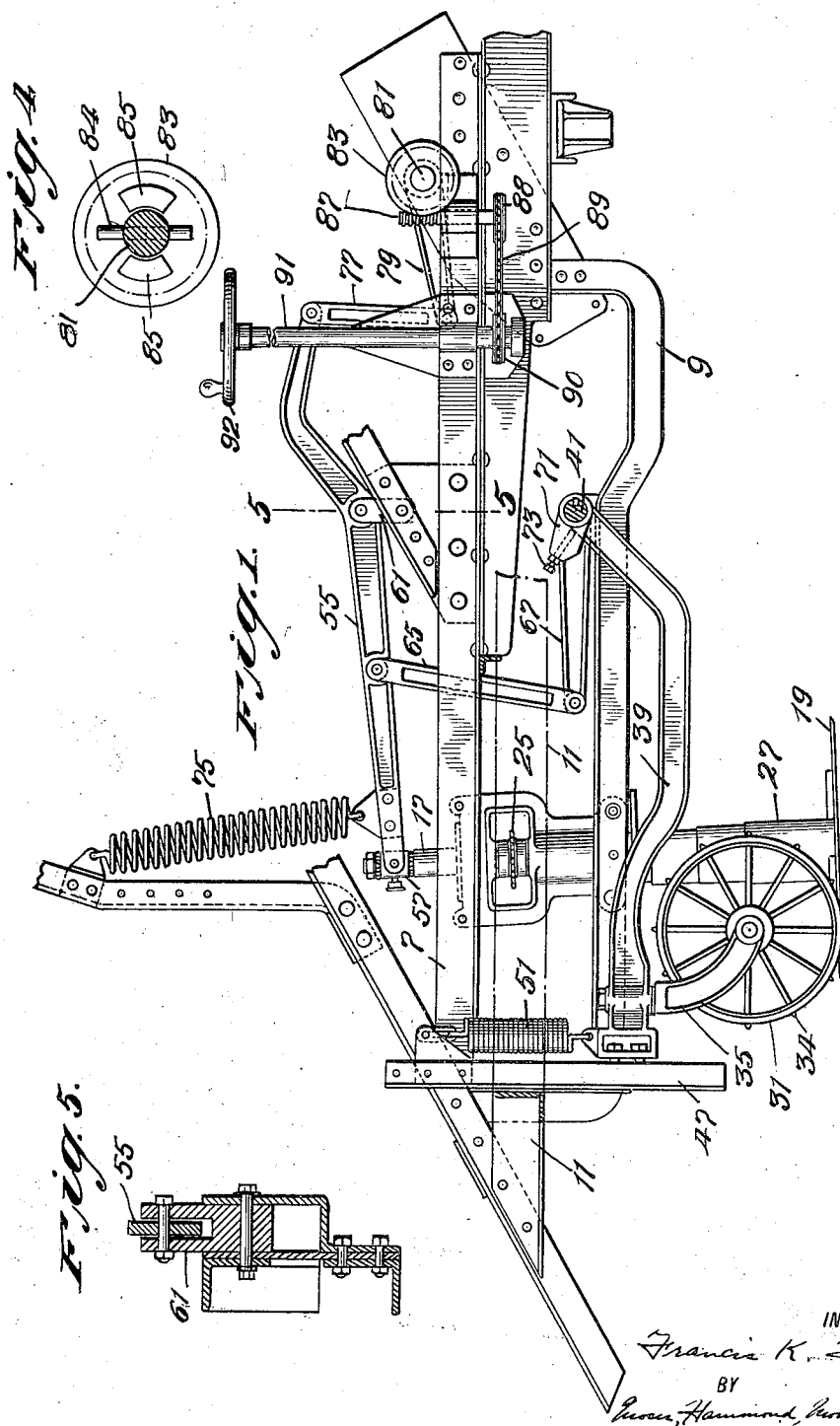
INVENTOR
Francis K. Flynn
BY
ATTORNEYS March 27, 1928.  1,664,203
F. K. FLYNN
CUTTING MECHANISM FOR CANE HARVESTERS AND THE LIKE
Filed Oct. 11, 1922   3 Sheets-Sheet 2
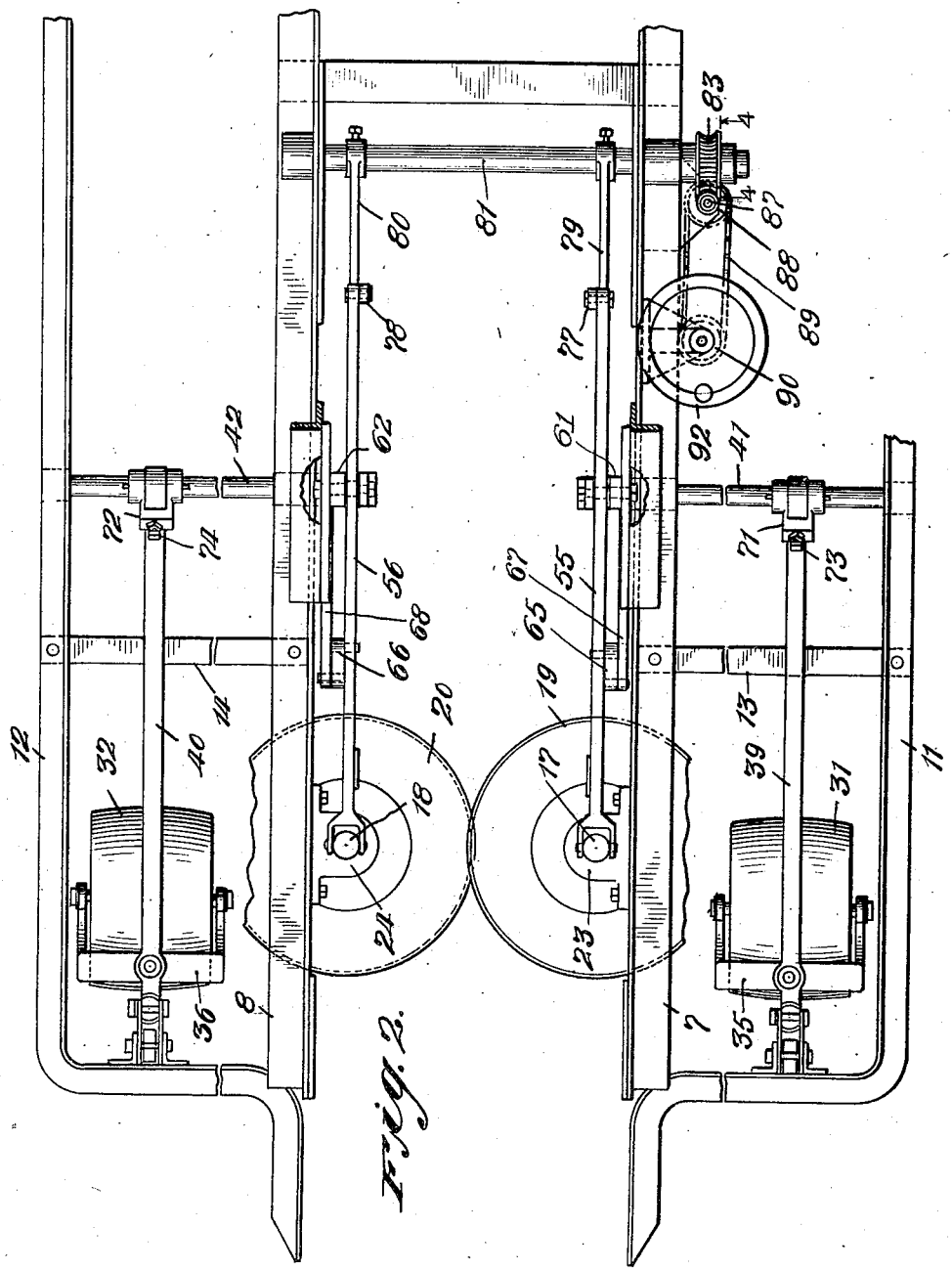
INVENTOR
Francis K. Flynn
BY
ATTORNEYS

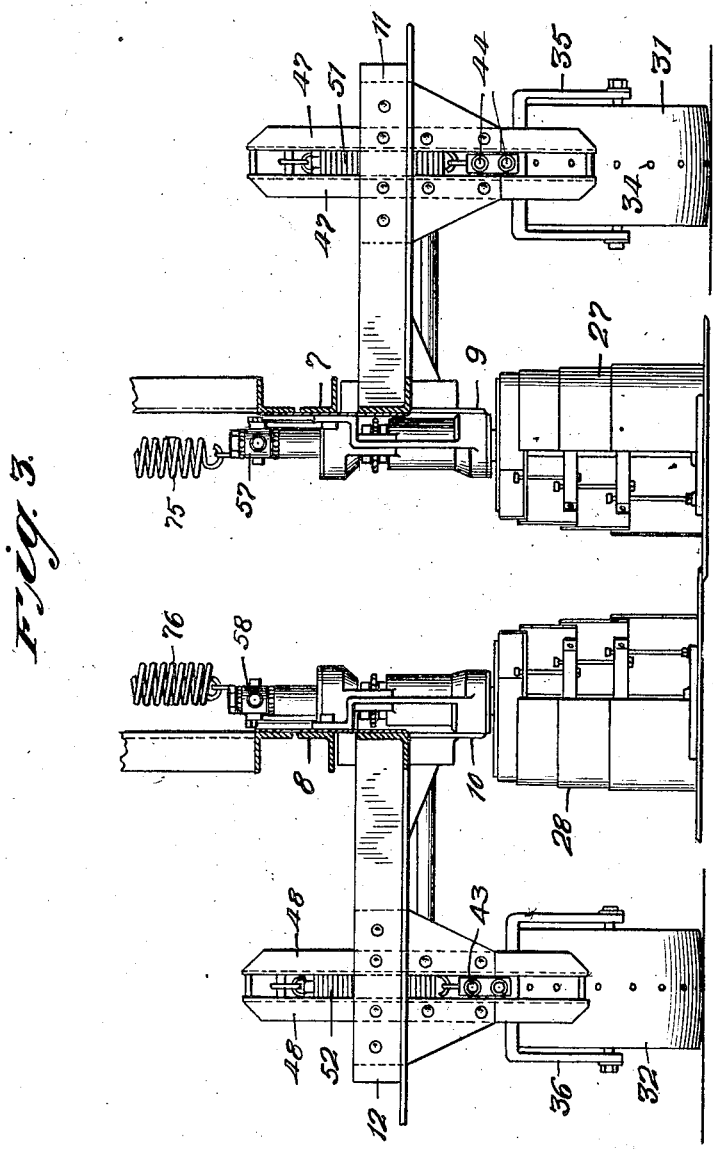

Patented Mar. 27, 1928.

1,664,203

UNITED STATES PATENT OFFICE.

FRANCIS K. FLYNN, OF NEW YORK, N. Y., ASSIGNOR TO LUCE CANE HARVESTER CORPORATION, OF NEW YORK, N. Y., A CORPORATION OF DELAWARE.

CUTTING MECHANISM FOR CANE HARVESTERS AND THE LIKE.

Application filed October 11, 1922. Serial No. 593,671.

This invention relates to apparatus for harvesting sugar cane or similar crops, and particularly to improvements in the means for cutting the cane at or below the surface of the ground.

The invention is particularly, although not exclusively, adapted for use in a cane harvester of the general type shown in the application of George D. Luce, Serial No. 296,539, filed May 12, 1919; and may be considered as in the nature of an improvement on the types of cutting mechanism described in the co-pending applications of George D. Luce and F. C. Douglas Wilkes, Serial No. 312,316, filed July 21, 1919, and the application of George D. Luce Serial No. 341,425 filed November 29, 1919. The aforesaid applications are assigned to the same assignee as the present application.

The general object of the present invention is to provide a new and improved cutting mechanism, or "floating bottom cutter", which is simple and rugged in construction and efficient in operation. This object is attained by a number of novel characteristic features among which may be mentioned the mounting of the cutters directly on the main frame of the harvester, and the provision of means for automatically causing the cutters to rise and fall with the varying contour of the ground, so that the cutting of the cane or other crop will take place always at approximately the desired level. The invention is further characterized by the provision of manually operable means, which does not affect the automatic rising and falling of the cutters during normal operation, but is, nevertheless, available at all times for the purpose of raising and lowering the cutters. Other novel features of the invention will hereinafter appear and will be pointed out in the appended claims.

Referring to the drawings, in which a preferred embodiment of the invention is illustrated, Figure 1 is a side elevation of a portion of a cane harvester having the invention embodied therein; Figure 2 is a plan view thereof, certain parts being diagrammatically indicated; Figure 3 is a front elevation thereof, with certain parts of the frame shown in section; Figure 4 is an elevation of a lost-motion connection which may be used in the mechanism; and Figure 5 is a section on the line V—V of Figure 1.

In the drawings, portions of the frame of the harvester which support the various parts embodying the present invention are illustrated in a more or less fragmentary way. The forward ends of the center main frame members are indicated at 7 and 8. Depending from these frame members, are auxiliary frames 9 and 10, one of which is shown in Figure 1; and there are side frames 11 and 12, which are secured to the main frame members 7 and 8 at their forward ends and by various transverse connecting frame members, two of which, 13 and 14, are shown. The frame structure need not be further described since it is obvious that it may be modified in many respects without departing from the spirit of the invention.

The cutter shafts 17 and 18, carrying at their lower ends the overlapping disc cutters 19 and 20, are substantially vertical, although slightly inclined forwardly in the machine, and are shown as journaled for rotatable and longitudinal movement in bearings 23 and 24 secured respectively to the frames 7 and 9 and the frames 8 and 10. As is best shown in Figure 1, the shafts 17 and 18 are each provided with a driving sprocket wheel 25 to which the shafts are slidingly keyed, the said sprocket wheels being located in recesses in the journals 23 and 24 provided for that purpose. These sprocket wheels are driven thru sprocket chains receiving power from the engine which drives the harvester. The cutter shafts 17 and 18 for some distance above the disc cutters 19 and 20 are surrounded by trash impellers 27 and 28 which are shown as being of the form described and claimed in the co-pending application of Luce and Wilkes hereinbefore mentioned.

In the operation of a sugar cane harvester, it is essential that the bottom cutters shall sever the cane stalks as near as possible to or even just below the surface of the ground In order to accomplish this, the bottom cutters must be constantly raised and lowered with the varying contours of the ground over which the harvester passes. By means of the mechanism which will now be described, this raising and lowering of the disc cutters 19 and 20 is automatically accomplished. Manually operable means is also provided for raising the cutters and holding them in a raised position when desired, for example, when the harvester is traveling to and from the place at which the cutting is to be performed.

Arranged at each side of the machine and adapted to run on the ground adjacent the cutters 19 and 20, are wheels 31 and 32 each of which preferably has a broad face as shown, and may be provided with projecting lugs 34. Said wheels are preferably mounted in the manner of casters in frames 35 and 36. The frames 35 and 36 are pivotally mounted as shown, so that they are free to turn as the harvester may change its direction, near the end of longitudinally extending levers 39 and 40 which are pivotally supported on shafts 41 and 42. The shaft 41 is journaled at its inner end in a bearing secured to the top of the frame member 9, and at its outer end in a bearing secured to the bottom of the frame member 11; and the shaft 42 at its inner end is journaled in a bearing secured to the top frame member 10, and at its outer end in a bearing secured to the bottom of the frame member 12. At their forward ends, the levers 39 and 40 are guided, so as to permit vertical but prevent lateral movement, by guide rollers 43 and 44 which are carried by the ends of said levers and extend between vertically arranged guides 47 and 48 secured to the front portions of the frames 11 and 12, as shown in the drawings. Secured to the front ends of the levers 39 and 40 are springs 51 and 52, which at their tops are connected to the guide frames 47 and 48; these springs being strong enough to overcome the downward pull due to the weight of the levers 39 and 40, wheel frame 35 or 36 and the wheel 31 or 32.

The cutter shafts 17 and 18 are connected to levers 55 and 56, which may be of the form best shown in Figure 1. At their forward ends the levers 55 and 56 are bifurcated and are connected to collars 57 and 58 which are journaled on the shafts 17 and 18, so as to permit the latter to rotate within said collars. The bearings between the collars 57 and 58 and the shafts 17 and 18 are preferably ball bearings in order that the friction at these points may be reduced to a minimum. The levers 55 and 56 are pivotally mounted in the vertically arranged links 61 and 62, which at their lower ends are pivotally supported in a portion of the frame of the harvester as best shown in Figure 5. These links 61 and 62 permit the levers 55 and 56 to have a slight longitudinal movement with reference to the machine, as the cutter shafts 17 and 18 are raised and lowered. The levers 55 and 56 are connected respectively to the shafts 41 and 42 by links 65 and 66 which at one end are pivotally connected to the levers 55 and 56 and at their other end are connected to levers 67 and 68 secured to and oscillatable with the shafts 41 and 42. As has been previously stated, the levers 39 and 40 are pivotally mounted on the shafts 41 and 42; but it will be noted from Figures 1 and 2 that adjacent the levers 39 and 40 the shafts 41 and 42 are provided with yokes 71 and 72 which are keyed to the shafts and engage the levers 39 and 40 when the outer ends of the latter are moved upwardly, said yokes being provided with screws 73 and 74 for the purpose of adjusting the angles at which the levers and yokes cooperate. With this arrangement, it will be understood that the upward movement of the wheels 31 and 32 positively causes upward movement of the forward end of the corresponding lever 55 or 56 with consequent raising of the cutter shaft attached to it; but falling of the wheels 31 and 32 does not positively pull down the forward end of the corresponding lever 55 or 56, but merely permits it to fall if it is not otherwise supported. To some extent, the levers 55 and 56 and the parts attached to them are preferably counterweighted by springs 75 and 76 connected as shown between a portion of the frame and the forward ends of the levers 55 and 56.

By reason of the mechanism which will now be described, levers 55 and 56 and consequently the cutter shafts 17 and 18 are caused to rise and fall in synchronism, but under the joint control of the wheels 31 and 32. Levers 55 and 56 at their rear ends are connected to links 77 and 78, which in turn are connected to levers 79 and 80 rigidly but adjustably secured to a shaft 81, which is journaled in the frame members 7 and 8. Any movement of the lever 55 or 56 caused or permitted by the rising or falling of the corresponding wheel 31 or 32 is thus transmitted to either lever. The manually operable means for raising the cutter shafts 17 and 18, hereinbefore mentioned, is connected to the shaft 81. This means is shown as comprising a worm wheel 83 mounted on the shaft 81, and having a lost-motion driving connection therewith which may consist of a pin 84 extending thru the shaft 81 and arranged to engage lugs 85 extending from the face of the worm wheel 83, as best shown in Figure 4. Meshing with the worm wheel 83 is a worm 87 carried by a stub shaft vertically journaled in the frame 7 and carrying at its lower end a sprocket 88. Meshing with the sprocket 88 is a sprocket chain 89 which engages another sprocket wheel 90 secured to and rotatable with a vertical post 91 journaled in a bearing carried by the frame 7, said post being provided at its upper end with a hand wheel 92 which facilitates manual rotation.

From the foregoing description, it will be evident that by rotating the hand wheel 92 the cutters may be raised to an inoperative position and held there, and that at the same time the wheels 31 and 32 will rise, owing to the pull of the springs 51 and 52 and will be held out of contact with the ground. This is the inoperative position of the bottom cutting mechanism, and the one in which these parts are carried while the harvester is in transit to and from the location at which it is to work. It will also be apparent that when the hand wheel 92 is rotated in the opposite direction, the cutters 19 and 20 will be allowed to fall, and the levers 39 and 40 carrying the wheels 31 and 32 will also be forced downwardly by reason of the connections between the levers 55 and 56 and the levers 39 and 40 hereinbefore described. With the cutters in their lower and operative position, the hand wheel 92 is so left that in case either of the wheels 31 or 32 rises owing to an elevation in the contour of the ground, the lost-motion connection consisting of the pin 84 and the lugs 85 in the worm gear 83 will permit movement of the levers 55 and 56 without interference by the manually operable means for moving these levers. In other words, when the cutters 19 and 20 are in their lower position, they may rise and fall freely under the control of the most elevated of the two wheels 31 and 32.

While I have shown and described one form in which my invention may be embodied, it is to be understood that this may be modified in many respects without departing from the spirit of the invention as defined in the claims hereto appended.

I claim:

1. A cane harvester comprising a frame, cutter shafts journaled in said frame for rotatable and longitudinal movement, and means mounted to run out of line with the cane being cut for automatically causing the cutter shafts to move longitudinally in said frame in conformity with the varying contour of the ground over which the harvester passes.

2. A cane harvester comprising a frame, cutter shafts journaled in said frame for rotatable and substantially vertical longitudinal movement, means mounted to run out of line with the cane being cut for automatically causing the cutter shafts to rise and fall in conformity with the varying contour of the ground over which the harvester passes, and manually operable means for raising said cutter shafts.

3. In a cane harvester, a frame, substantially vertical cutter shafts journaled in said frame for rotatable and longitudinal movement, cutters carried by said shafts, wheels adapted to run on the ground adjacent the side of the cutters and supported for vertical movement with reference to said frame, and connecting means between said wheels and said cutter shafts for transmitting the vertical movement of said wheels to said cutter shafts.

4. In a cane harvester, a frame, substantially vertical cutter shafts journaled in said frame for rotatable and longitudinal movement, cutters carried by said shafts, wheels adapted to run on the ground adjacent the side of the cutters, a pivotal connection between said wheels and said main frame permitting vertical movement of the wheels with reference to said frame, and connecting means between said pivotal connection and said cutter shafts for transmitting the vertical movement of said wheel to said cutter shafts.

5. In a cane harvester, a frame, substantially vertical cutter shafts journaled in said frame for rotatable and longitudinal movement, cutters carried by said shafts, wheels adapted to run on the ground adjacent the side of the cutters and supported for vertical movement with reference to said frame, and connecting means between each of said wheels and both of said cutter shafts for transmitting the vertical movement of either of said wheels to both of said cutter shafts.

6. In a cane harvester, a frame, substantially vertical cutter shafts journaled in said frame for rotatable and longitudinal movement, cutters carried by said shafts, wheels adapted to run on the ground adjacent the side of the cutters and supported for vertical movement with reference to said frame and connecting means between said wheels and said cutter shafts for transmitting the upward movement of said wheels to said cutter shafts and permitting the latter to descend freely as said wheels descend.

7. In a cane harvester, a frame, substantially vertical cutter shafts journaled in said frame for rotatable and longitudinal movement, cutters carried by the lower ends of said shafts, wheels adapted to run on the ground adjacent the side of said cutters and supported for vertical movement with reference to said frame, connecting means between said wheels and said cutter shafts whereby the latter are caused to move upward in accordance with the upward movement of said wheels, and manually operable means carried by said frame and co-operating with said cutter shafts for raising the latter.

8. In a harvester or the like, a frame, substantially vertical cutter shafts journaled in said frame for rotatable and longitudinal movement, cutters carried by the lower ends of said shafts, wheels adapted to run on the ground adjacent said cutters and supported for vertical movement with reference to said frame, connecting means between said wheels and said cutter shafts whereby the latter are caused to move upward in accordance with the upward movement of said wheels, manually operable means carried by said frame and co-operating with said cutter shafts for raising the latter, and a lost-motion connection in said manually operable means whereby said means may be left inoperative during normal operation when the cutter shafts are moving in accordance with the movement of the wheels.

In testimony whereof I have affixed my signature to this specification.

FRANCIS K. FLYNN.